(12) United States Patent
Mayer et al.

(10) Patent No.: US 12,294,921 B2
(45) Date of Patent: May 6, 2025

(54) DATA EXCHANGE BETWEEN A MOBILE TERMINAL AND A CONTROL MODULE OF A CAR WASH FOR FEEDBACK OF EVALUATION SIGNALS

(71) Applicant: WashTec Holding GmbH, Augsburg (DE)

(72) Inventors: Stefan Mayer, Neusaess (DE); Oliver Foerg, Augsburg (DE); David Stecher, Monheim (DE)

(73) Assignee: WashTec Holding GmbH, Augsburg (DE)

( * ) Notice: Subject to any disclaimer, the term of this patent is extended or adjusted under 35 U.S.C. 154(b) by 170 days.

(21) Appl. No.: 18/055,746

(22) Filed: Nov. 15, 2022

(65) Prior Publication Data

US 2023/0156439 A1 May 18, 2023

(30) Foreign Application Priority Data

Nov. 15, 2021 (EP) ..................................... 21208275

(51) Int. Cl.
*H04W 4/38* (2018.01)
*B60S 3/06* (2006.01)
*G06F 3/0482* (2013.01)

(52) U.S. Cl.
CPC ............... *H04W 4/38* (2018.02); *B60S 3/063* (2013.01); *B60S 3/066* (2013.01); *G06F 3/0482* (2013.01)

(58) Field of Classification Search
CPC .......... H04W 4/38; B60S 3/063; B60S 3/066; B60S 1/62; B60S 1/66; G06F 3/0482
See application file for complete search history.

(56) References Cited

U.S. PATENT DOCUMENTS

| | | |
|---|---|---|
| 2012/0253973 A1 | 10/2012 | Harter |
| 2017/0121019 A1 | 5/2017 | Shin |
| 2019/0111897 A1* | 4/2019 | Dowling .................. A47L 7/02 |
| 2020/0198594 A1 | 6/2020 | Petershagen |
| 2022/0250590 A1* | 8/2022 | Gimeno Ferrer .... G07C 5/0808 |
| 2023/0111974 A1* | 4/2023 | Chen ...................... G16H 50/20 |
| | | 600/300 |

FOREIGN PATENT DOCUMENTS

EP    3671591 A2    6/2020

OTHER PUBLICATIONS

Yang Yu et al., Design of Intelligent Car Washing System, Jul. 1, 2015, SICE Annual Conference, pp. 1-4 (Year: 2015).*
I. Kafiev et al., Control System of Portal Car Wash based on the Mamdani Fuzzy Algorithm, Aug. 6, 2020, International Multi-Conference on Industrial Engineering and Modern Technologies, 1-6 (Year: 2020).*

* cited by examiner

*Primary Examiner* — Tam T Tran
(74) *Attorney, Agent, or Firm* — SLEMAN & LUND LLP (57) ABSTRACT

A system for modifying process data of a car wash based on captured evaluations of vehicle washes performed on the car wash, comprising: a set of mobile terminals, each adapted to perform an algorithmic evaluation process; and a control module, implemented on the car wash, for controlling and/or regulating the car wash based on the detected feedback signals encoding evaluations of vehicle washes performed on the car wash, and in data communication with the mobile terminals via the control interface.

23 Claims, 6 Drawing Sheets

DATA EXCHANGE BETWEEN A MOBILE TERMINAL AND A CONTROL MODULE OF A CAR WASH FOR FEEDBACK OF EVALUATION SIGNALS

The present invention is in the field of vehicle washing systems and relates to a decentralized quality improvement system and, in particular, to a method, a system for modifying process data of a washing system, a control module and a computer program.

In the washing of vehicles, the quality of the wash is an important assessment standard that is relevant for both manufacturers and operators of car washes to initiate appropriate improvement measures. The quality assessment is typically carried out by the customer, i.e. the vehicle driver. An assessment of the wash quality or the wash result contains important information, e.g. to improve the wash sequence and/or to design certain wash processes differently.

In known prior art systems, systematic quality assessment does not take place or takes place only inadequately.

It is therefore the object of the present invention to provide means in which the quality can be recorded simply and systematically and in relation to position data of the vehicle body. Furthermore, it should be possible to analyze the recorded quality assessment in relation to the respective washing units involved.

This object is solved by a computer-implemented method for evaluating a vehicle wash performed on a car wash by a system, a control unit and a computer program. Further advantageous embodiments and further embodiments of the invention can be found in the following description.

In a first aspect, the invention is solved by a computer-implemented method for evaluating a vehicle wash performed on a car wash. The method can be executed, for example, on a mobile terminal, such as a smartphone or tablet (e.g., app on cell phone). For this purpose, the method comprises the following method steps, which are at least partially and preferably completely executed on a mobile terminal device:
  Providing a human-machine interface, HMI, and a control interface to a control module of the washing system;
  Outputting fields on the HMI that are used to detect at least one evaluation signal to evaluate the wash;
  Upon detection of a negative evaluation signal: reading in a generated interactive virtualized representation of the vehicle, wherein the generated interactive virtualized representation is preferably output on the HMI;
  Issuing a request or prompt on the HMI to activate the areas to be objected in the generated and output interactive virtualized representation;
  Capturing activation signals in the interactive virtualized representation;
  Reading of identification signals to identify the objected areas on the vehicle based on the detected activation signals; the identification can be performed locally on the mobile terminal (as part of an application installed there) or on a server that is in data connection;
  Generating feedback signals for forwarding to the control module via the control interface, the feedback signals encoding the identified objected areas on the vehicle.

On the basis of the feedback signals, the control module can then use an identification algorithm to determine the working units that were involved in cleaning the objected areas (indicated in the feedback signal). Maintenance measures can be initiated automatically and/or rule-based for the identified working units.

In a preferred embodiment of the invention, the generated interactive virtualized representation of the vehicle is vehicle type-specific or vehicle-specific or individual for a vehicle. The vehicle type-specific generation of the interactive virtualized representation may be based on a vehicle type data set captured by an application on the mobile terminal (e.g., by input on an input field on the HMI). The vehicle-specific generation of the interactive virtualized representation can additionally still be based on sensor signals from an optical capture device (e.g., camera, LIDAR sensors) in which the vehicle is mapped. The captured sensor signals can also be stored and accessible in a memory for later applications.

In a further preferred embodiment of the invention, the generation of the interactive virtualized representation of the vehicle can be performed in response to sensor data and/or with access to a stored feature model that represents or encodes the contour of the respective vehicle or vehicle type and thereby characterizes distinctive geometric features of the vehicle, in particular in response to a captured vehicle model data set and a captured year of manufacture data set. This makes it possible to render the virtualized representation as close to reality as possible by means of a render engine, thereby representing the respective features of the vehicle (spoiler, mirrors, oversize wheel well, roof box) in virtualized form.

In another preferred embodiment of the invention, the feedback signals may comprise status signals specifying the wash performed. Status signals can specify, for example, the wash units that have been used for the car wash and, if necessary, other parameters (time specifications, when and for how long, etc.) can specify the wash sequence or the wash program that has been applied.

In another preferred embodiment of the invention, the feedback signals may include meta-information about the wash that was performed, the vehicle, the wash that was used to perform the wash, and/or the evaluations. The meta-information may specify, for example, which wash program has been applied to the wash being evaluated and how many times it has been applied to other washes that day. The meta-information can specify, for example, which contour (outline, such as length, width, height) the washed vehicle had and/or how the vehicle was positioned in the washing system (detected by sensors, such as light barriers or other optical sensors, etc.).

In another preferred embodiment of the invention, an adaptive dialog menu may be provided on the HMI for specifying the ratings, which is "adaptive" in that it is generated based on the captured evaluation signals and/or in response to other signals captured on the HMI. In other words, an adaptive dialog may be implemented that is generated based on processing of the sensed evaluation signals and preconfigurable rules that may be stored in a rule base accessible over a network.

In a preferred embodiment of the invention, whether the evaluation signal is a positive evaluation signal or a negative evaluation signal is detected and algorithmically differentiated. In a first embodiment of the invention, the interactive virtualized display may be generated only when a negative rating signal has been detected to provide the user with an opportunity to object to areas of the vehicle with respect to wash quality. Positive ratings then generally apply to the entire wash, so that the interactive virtualized representation need not be generated and/or output. In a second embodiment of the invention, the interactive virtualized representation may also be generated when a positive rating signal has been detected to provide the user with an opportunity to positively rate areas of the vehicle with respect to wash quality.

The solution of the object was described above on the basis of the method. Features, advantages or alternative embodiments mentioned therein are likewise to be applied to the other claimed subject matters and vice versa. In other words, the apparatus-based claims (directed, for example, to a control module or to a computer program) may also be further formed with the features described or claimed in connection with the method, and vice versa. The corresponding functional features of the method are thereby formed by corresponding subject modules, in particular by hardware modules or microprocessor modules, of the system or the product, and vice versa. The preferred embodiments of the invention described above in connection with the method are not explicitly repeated for the device. In general, in computer science, a software implementation and a corresponding hardware implementation (e.g., as an embedded system) are equivalent. For example, a method step for "storing" data may be performed with a memory unit and corresponding instructions for writing data to the memory. Therefore, to avoid redundancy, the device is not explicitly described again, although it may also be used in the alternative embodiments described with respect to the system.

In another aspect, the invention relates to a system for modifying process data of a car wash based on detected evaluations of vehicle washes performed on the car wash, comprising:—
- A set of mobile terminals, each of which is adapted to perform a method as described above;
- A control module implemented on the car wash and used to control and/or regulate the car wash based on the acquired feedback signals encoding evaluations of vehicle washes performed on the car wash and in data exchange with the mobile terminals via the control interface.

In a preferred embodiment of the invention, the system may further comprise a central processing unit that is in data communication with the respective control modules of the washers of a plurality of washers and that is adapted to determine control variables for the plurality of washers based on the feedback signals for the plurality of washers.

The central processing unit can, for example, be implemented on a server (e.g., accessible via the Internet, as a cloud server). The central processing unit is structurally superior to a plurality of washing machines. Alternatively or cumulatively, several machines can also store or collect their feedback signals vehicle-specifically, but superordinate to the washing plant, e.g. in a vehicle feature model (which acts as a norm collective).

The evaluation of the wash by the customer is preferably carried out in the app. The algorithmic evaluation of the detected activation signals and the feedback signals generated from them can in principle be carried out locally on the machine and in particular in the control module. The local evaluation on the machine can be performed using local (i.e., car wash-specific, but cross-vehicle) reference data. The evaluation can be vehicle type-specific or vehicle-specific.

Alternatively or cumulatively, the evaluation of the activation signals and the calculated feedback signals, which encode an evaluation of the executed wash, can be carried out centrally on a central processing unit. This offers the possibility of further evaluations, in particular a comparison with central reference values from other machines. If the number of objections on the carwash accumulates on a vehicle-specific basis, the stored wash sequences are poorly optimized. If the complaints accumulate on a plant-specific basis (i.e. for a specific plant from a set of plants), the plant is poorly adjusted or defective. This can be detected by the central processing unit and transmitted back to the respective washing plant.

The feedback signals are sent from the app to at least one external entity via a wireless network interface.

There are several implementation options for processing the feedback signals:
1. The app sends the feedback signals to the control module installed on the respective car wash and at the same time to the central processing unit. Alternative:
2. The app sends the feedback signals (only) to the respective control module of the car wash and this functions quasi as a gateway and loops the captured feedback signals through or on to the central processing unit for further processing. Alternative:
3. The app sends the feedback signals only to a central processing unit for further processing. This is a preferred embodiment of the invention.

In a preferred embodiment of the invention, the central processing unit is designed to evaluate the feedback signals from a plurality of terminal devices with respect to different washing systems and, in particular, to evaluate them for comparative evaluation of all washing systems, so that benchmark values are determined for one washing system at a time and/or for program sections of a wash, which are transmitted by the central processing unit to an instance of the respective washing system. The instance can forward the received messages to further devices (e.g. to a mobile device of the operator or a service technician).

In a further preferred embodiment, the feedback signals for an individually objected wash can be compared on the control module and/or the central processing unit with local and/or central reference values in order to generate and output a deviation message in the event of deviations. In the background or as a background process, a comparison can be initiated between the feedback signals or assigned measured values of the objected individual wash with reference values or a norm collective according to (rough) vehicle class and/or according to vehicle type and/or according to washing system and/or according to a feature of a feature model, in order to be able to automatically identify any misadjustments or defects present on the machine or washing system. However, this requires the use of corresponding standard values and is carried out by processing statistical values, such as mean value, variance, etc.

In another preferred embodiment, the feedback signals from multiple terminals can be evaluated with respect to one car wash at a time to automatically initiate verification actions on the car wash in the event of a statistically significant accumulation of one type of feedback signal.

In another preferred embodiment, the verification measures may include comparing set values to a preconfigurable reference value or reference value interval with respect to the type of feedback signal. For example, blower drying problems may be due to overrun speeds that are set too high, chemical concentration of the drying agent that is too low, and/or overrun speeds that are too high, and/or water quantities that are too low during previous purge runs. The reference value for the maximum speed of a rotary drive unit, e.g. for the gantry speed, a lifting speed for a roof dryer or the power of a brush rotary drive or the water flow rate of an application unit can be read out from a memory and compared with the content of the feedback signal. If the feedback signal indicates, for example, that the value for a particular rotary drive unit must be reduced, a check can be made to determine which reference values are stored for the speed of the rotary drive unit in question. If the check shows that the reference values are also lower than the current setting value, a change in the current setting value (in this case a reduction) can be initiated automatically.

Alternatively or cumulatively, a local check of a working unit of the washing system can be carried out as part of a predictive maintenance procedure based on the feedback signals. This is based on the technical background that it can usually be assumed that a maintenance measure or at least an inspection measure of the drive unit is to be recommended if there is an accumulation of objected areas that have been processed with the respective drive unit. In a configuration phase, a threshold value for the accumulation can be set so that, for example, from a value of more than 1.5% of objections in a matching area, an inspection measure is automatically triggered and/or initiated.

In a further preferred embodiment, the control module can be set up to store process data from activated work units in a memory (ring buffer or database) as part of washes performed on the washing system. Alternatively or cumulatively, the control module can be further set up to correlate the feedback signals received from the mobile terminal via the control interface with the stored process data, in particular to correlate them on a position basis, in order to initiate verification measures only for selected working units, namely for those working units that have been activated during the wash in the objected areas.

The process data encode the working units activated or applied for the executed wash. The process data can cumulatively still include setting values of the working units, such as dosing settings and dosing power, the power consumption of the brushes over the contour of the vehicle, the position sensors, inclination sensors as well as infeed values (e.g. of the roof and/or side brush) and thus their immersion depth, etc. The process data may alternatively or cumulatively include metadata about the working units, such as timing (time of activation), duration (of activation). The process data can cumulatively or alternatively comprise level messages of the (chemical) washing substances. The level messages are calculated from level data read in from level sensors located in the respective wash substance container. If there is not enough washing substance, the quality of the wash cannot be ensured.

According to another aspect, the invention relates to a control module for a system as described above. The control module may also be implemented in the system. The control module is formed with:

A control interface to a set of mobile terminals, each of which is configured to perform a method as described above;

wherein the control module is implemented on the washing system and serves to receive generated feedback signals, wherein the feedback signals encode the identified objected areas, and wherein the control module serves to control and/or regulate the washing system and in particular the working units addressed in the feedback signals (i.e. on the basis of the detected feedback signals) to vehicle washes carried out on the washing system.

Preferably, the control and/or regulation of those working units is carried out which are addressed in the feedback signals. The control and/or regulation can, for example, include a control with changed setting values (e.g. changed brush rotation speed), an initiation of a check measure and/or even a replacement of the working unit.

According to another aspect, the invention relates to a computer program, the computer program being loadable into a memory unit of a computing unit and comprising program code portions for causing the computing unit to execute the method for controlling and/or regulating a car wash when the computer program is executed in the computing unit.

The computing unit can be implemented in the controller of the washing system, for example. The computer unit can read in from a memory which washing units are installed in the washing system and in which form and version. The computing unit thus has knowledge of the "installation situation" of the washing system and can take this into account when calculating the control data.

The processor can also be formed in the control system and in particular in the local computing unit and thus implemented locally on the car wash, so that the processor interface is an internal interface, e.g. bus interface. Alternatively, the processor can also be implemented on a central server that exchanges data with the control system via a network interface (e.g. http/s).

In another preferred embodiment of the invention, the car wash system is a gantry car wash system, a car wash line or a commercial vehicle car wash system. Preferably, the system is used for a gantry car wash. Alternatively, the system may be used for a car wash or a commercial vehicle wash. In a car wash, the washing units (e.g. roof brush or side brush) or, if linear technology is used, the travel movement of the gantry can be specifically controlled.

The control module is an electronic component that can be configured, for example, as a controller (e.g., PLC) on the car wash.

The identification of the objected areas on the vehicle based on the detected activation signals is preferably performed by a position algorithm. The position algorithm requires a coordinate transformation from the virtual image space into the coordinate space of the machine (car wash) and/or the washed vehicle.

The generated interactive virtualized representation (representation for short) of the vehicle is calibrated with the real vehicle and especially the contour. Thus, positions in the representation can be converted to positions on the vehicle. Alternatively or cumulatively, captured positions in the representation can be mapped into features of an implemented feature model.

The feature model is accessible in a generated form and stores the washing process-relevant vehicle model/type-specific features of the vehicle for each input data record, in particular from a first data record that identifies a vehicle model or a vehicle type and a second data record that identifies the year of manufacture of the vehicle. For example, to a first input data set, such as Volvo, V70, year of manufacture 2020, a first feature, e.g. mirror with position data, size data and optionally still control parameters that characterize a wash sequence for washing the mirror, e.g. in the case of extra wide mirrors, to what extent the feed of the actuator for lateral movement of the side brush in the direction towards the vehicle must be reduced. The feature model may be implemented in a (central) database or in a simple form as a structured table-like data structure. Each entry in the feature model can be identified by an identifier. The entry for a feature can optionally still include instruction data that identifies instructions for advantageous execution of the washing process (e.g. chemical additive required, etc.). The feature model is created once and can then be deployed decentrally on each of the connected washers and operated locally there. However, the feature model can also be implemented decentrally in the control system of the respective car wash and, for example, be updated on a regular basis, so that an updated instance of the feature model is uploaded to, for example, the controller and/or an SD card of the car wash.

The feature model thus contains contour sections and position information and/or size information of add-on parts, such as wheels, mirrors, handles, spoilers, wipers, license plates (especially at the rear), bumpers, spare wheels and/or running boards. Furthermore, only the transitions from a first contour section (e.g. hood) to a second contour section (e.g. windshield) are included in the feature model. All intervening positional data of an underlying 2D/3D model are deleted. In particular, sections can be deleted from the contour data of the 2D/3D model, e.g., contour data identifying the beginning of the "hood" section and contour data identifying its end are retained and transferred from the 2D/3D model to the feature model, while all intervening contour data (representing the hood area) are deleted. Thus, only relevant position data for each feature is extracted from the underlying 2D/3D model of the vehicle type. Color or interior data, for example, are not included in the feature model. Also, all data that have no influence on the wash and/or the wash process are filtered out. Compared to the 2D/3D model, the feature model is thus much less memory intensive and comprises only a few kilobytes. Basically, the degree of compression (2D/3D model->feature model) can be determined based on the accuracy and/or machine tolerances of the wash. The feature model only has to be as accurate as the machine or the washing plant can work with its units. For example, deviations from an idealized plane by +/−2 cm can be ignored.

The feature model can also be vehicle-specific for selected vehicles if all features of the vehicle have been recorded in the feature model and the respective vehicle can be uniquely identified, e.g., via the license plate number. For this purpose, the feature model is available centrally in a memory, e.g. in an online database for feature models. Relevant position and/or size data and/or geometric data for one feature in each case are extracted from a 2D or 3D model of the vehicle type. A feature refers to a vehicle and its vehicle geometry and/or vehicle contour. In a preferred embodiment, a feature may particularly refer to a production or standard vehicle. For example, a feature may be the mirror. In other words, for example, a Volvo of the type V70 from the year of manufacture 2020 always has a feature "mirror" at position xyz in size abc. A vehicle usually has several such features.

The washing sequence requires the use of different washing units of the washing system at different times. The washing sequence or the washing sequence data characterize the time, the duration and/or the type of operation of a washing unit, such as the time, the duration of an activation of the side brush and when a brush rotation direction reversal has to take place. The washing sequence or the washing sequence data depend on the configuration of the respective washing system, in particular e.g. the installed washing units and/or the "installation situation".

A feature (e.g., mirror or spoiler lip) is a characteristic of the vehicle that is relevant to the quality assessment of the vehicle wash. A feature can be an area on the vehicle and/or on its outer contour, such as an add-on part. However, the feature can also be extended to geometrically adjacent areas, such as in the case of the wheel well feature. The wheel housing deflects the washing brush (washing unit), which leads to poor washing quality in the area behind the wheel housing. The "Wheel housing" feature is therefore extended to the area adjacent to the rear during treatment. At least one feature of the feature model may be used to generate the interactive virtualized representation of the vehicle in a preferred embodiment of the invention. Cumulatively or alternatively, at least one feature may be used to generate the feedback signals.

Parameters relevant to the washing process can be calculated from the feature. A feature can be, for example, a geometric characteristic of the vehicle, whose geometric data (e.g. length, height, width, position) can be represented in a highly simplified form by means of a vector representation or even as a number. A feature can have different properties, such as length, height, width, position. The properties are classifying and lead to the selection of a certain washing procedure (treatment routine of the car wash). A feature is preferably vehicle model or vehicle type specific. It may or may not be vehicle-specific. Tuning parts, for example, are vehicle-specific. If the respective vehicle is uniquely identified, for example by a license plate recognition, a perfectly adapted washing sequence can also be determined for the tuning parts.

The identification of the objected areas on the vehicle is basically based on the previously detected activation signals.

A set of signals are processed: Evaluation signals, especially negative or positive evaluation signals, activation signals and feedback signals, which are defined below.

The evaluation signal may be a binary signal to represent a positive or negative evaluation (good or bad). In a more complex embodiment of the invention, the rating signal may also be categorical and represent multiple rating classes, which in turn are "mapped" to two binary classes (good or bad) using classification rules. The evaluation signal may be a digital signal.

The activation signal is detected on the HMI of the mobile terminal. A singular activation signal can be acquired to identify a single area of the wash to which the evaluation is to apply, but multiple activation signals can also be acquired sequentially to evaluate multiple areas of the vehicle. This is preferably done iteratively, so that a first area is evaluated first and then a second area, etc. In particular, the activation signals are detected in the generated and output interactive virtualized representation. As a result, the activation signals implicitly include a position indication in the interactive virtualized representation. The activation signals may be mouse clicks and/or keystrokes. It is also possible to capture speech inputs, and to convert them by an audio algorithm into positional indications on the generated interactive virtualized representation, which can then be confirmed or discarded by an output confirmation field. The activation signals are thus electronic signals.

The feedback signals are digital signals that mark the identified objected or positively evaluated areas of the executed vehicle wash in the coordinate system of the car wash and/or the vehicle. The feedback signals are transmitted to the control module via the control interface. After receiving the feedback signals on the control module, the control module can evaluate which vehicle areas have been evaluated negatively and possibly which other vehicle areas have been evaluated positively. For the negatively evaluated vehicle areas, a further identification algorithm is executed to determine the involved working units that were involved in the washing of the identified and objected vehicle area. Subsequently, the involved working units can be subjected to a verification procedure.

In the following detailed description of the figures, non-restrictive examples of embodiments with their features and further advantages are discussed on the basis of the drawing.

DESCRIPTION OF EMBODIMENT EXAMPLES ON THE BASIS OF THE FIGURES

The present invention is based on the problem that in previous vehicle washing plants or vehicle washing systems from the prior art, an evaluation of the executed vehicle wash could only be considered insufficiently or partly even not at all for the further control and/or regulation of the washing plant, the inspection of working units and for the optimization of the process sequences. Even if the vehicle owner or customer (of the vehicle washing system) is provided with the possibility to evaluate the executed wash, there have been no means and possibilities to use this evaluation in a systematic way for further improvement of the washing processes of the washing system.

Figure 1:
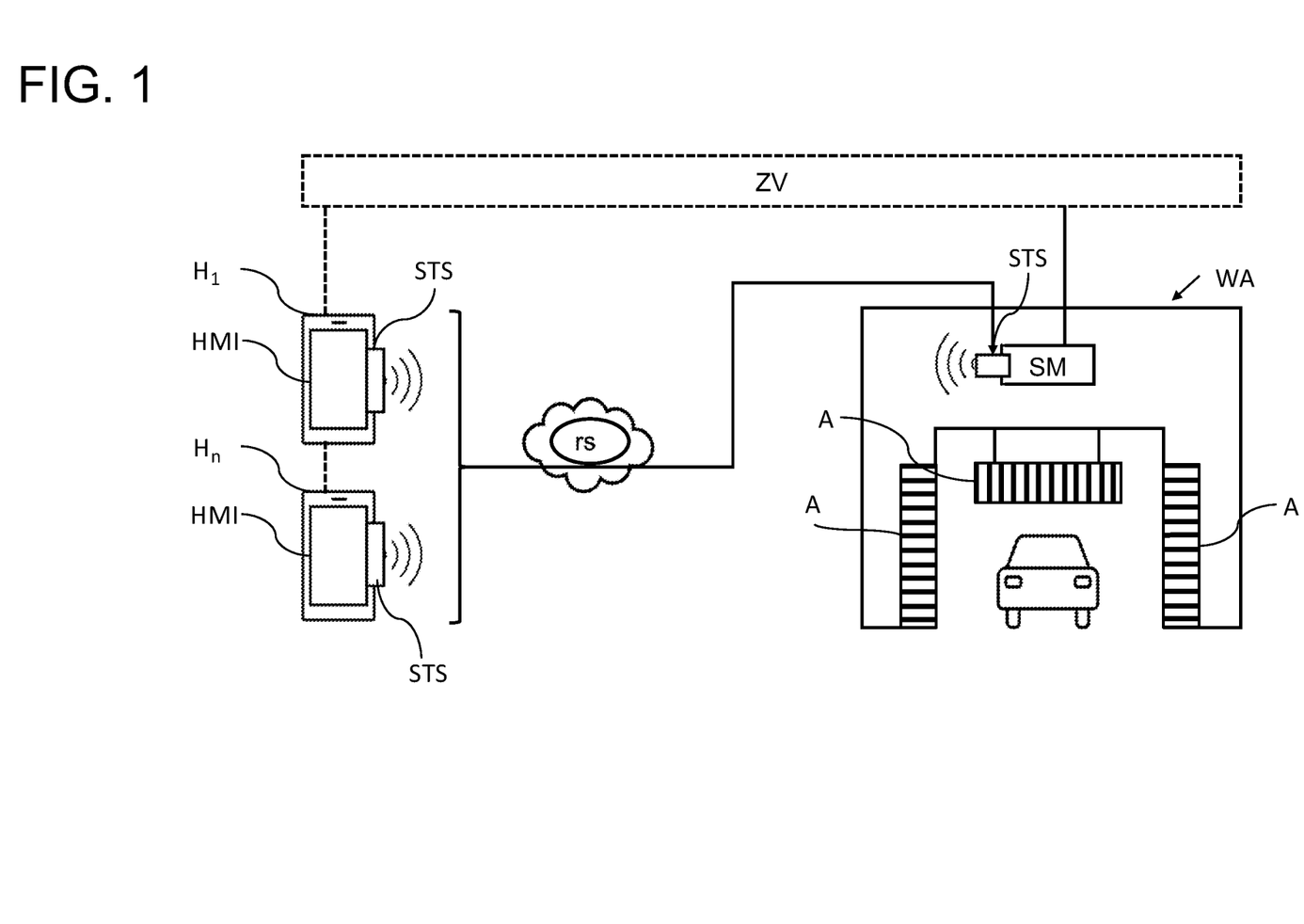
FIG. 1 is a schematic overview representation of a control system for controlling and/or regulating a car wash in response to detected feedback signals according to a preferred embodiment of the invention.

To enable this, the present invention proposes a system shown schematically in FIG. 1. The system comprises a plurality of mobile terminals H, which may be, for example, smartphones, tablets or other mobile devices. An application is installed on each of the mobile terminals, which is intended to form a control interface STS and a human-machine interface HMI. The control interface is used for communication with the washing system WA and in particular with a control module SM. In the example shown in FIG. 1, a gantry-type washing system WA is depicted, which comprises two side brushes and a roof brush as working units A. It is obvious to the person skilled in the art that the washing system comprises, in addition to the aforementioned working units A, further washing means and tools, such as rim brushes, a drying unit, spray nozzles, etc. (not explicitly shown in FIG. 1). The control interface STS is preferably a wireless interface (for example via a radio network or via the Internet, for example using http/s protocol) and connects the mobile terminal H to the control module SM, which can either be implemented directly on the washing unit WA (shown in FIG. 1) or is in data exchange with it. As shown schematically in FIG. 1, the control interface STS comprises a client portion (on the mobile terminal H) and a server portion (on the control module SM). The human-machine interface HMI is used for inputting and/or outputting data. The control interface STS is used to transmit data between the mobile terminal H and the control module SM and, in particular, to transmit feedback signals rs from the mobile terminal H to the control module SM.

In a further preferred embodiment, a central processing unit ZV can be provided—optionally—which can be operated, for example, as a central cloud-based server for a set of washing units WA and/or for a set of mobile terminals H. As shown in FIG. 1, the central processing unit ZV interacts with one control module SM at a time from the set of control modules SM. Optionally (and therefore only shown dashed lines in FIG. 1), a data link can also be provided between the respective mobile terminal H and the central processing unit ZV. Even though the formation or provision of the central processing unit ZV is only optional and therefore shown in dashed line in FIG. 1, it is preferred. The central processing unit ZV is used to calculate control data (for the control modules SM) across washing systems in response to the respective feedback signals rs acquired. For example, it is possible to aggregate or accumulate feedback signals for different vehicles and/or from different mobile terminals H in order to calculate average values or benchmark values therefrom. The benchmark values calculated in this way can then be reported back to the respective control modules as a reference value by way of a message exchange. For example, the information for local processing shown schematically below, can thus be transmitted to a specific washing system WA or its control module SM:

The feedback signals abc were detected for the executed vehicle wash xyz. The working units A1 and A5 are affected by the feedback signals abc (result of an identification algorithm). An improvement algorithm implemented on the control module SM outputs changed setting values for the working units A1 and A5 as a result, so that the working units A1 and A5 do not cause any more objectionable areas in future washes. This result can be compared with benchmark values from other washing units. Thus, for example, the information 'Changed setting values were also applied to working units A1 and A5 on other washes' can be provided. The benchmark values can thus be used to verify the locally implemented improvement algorithm.

The identification algorithm implemented on the control module SM is used to identify from the received feedback signals rs at least one respective affected working unit A (several working units A may also be affected) which were involved in cleaning the vehicle areas to which the feedback signals rs refer.

The control module SM comprises a memory or is in data exchange with a memory on which the feedback signals rs and/or the working units A affected by means of the identification algorithm are stored. This makes it possible to check, after the expiry of certain time intervals or event-based, whether such feedback signals rs concerning the same working units A are received from different mobile terminals for different executed washes. In this case, a threshold value (e.g. >2) can be defined, which, when exceeded, automatically triggers a maintenance procedure and/or a maintenance measure for the respective working unit(s) A.

Figure 2:
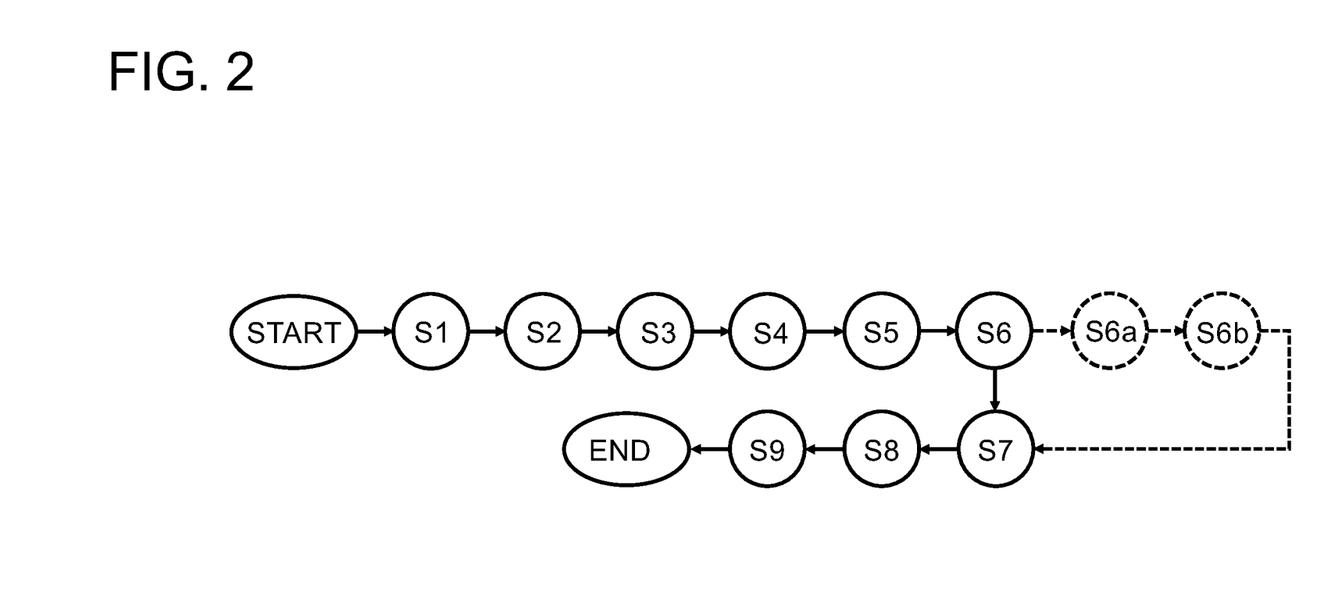
FIG. 2 is a flowchart for a method of evaluating a vehicle wash according to an alternative embodiment of the invention.

FIG. 2 shows a flowchart of a method for evaluating a performed vehicle wash by means of an application implemented on a mobile terminal H. The application is implemented on the mobile terminal H and is used in step S1 to generate the human-machine interface HMI and the control interface STS (to the control module SM). Further, the application is configured to output fields, in particular input fields for inputting evaluation signals, on the human-machine interface HMI. The evaluation signals are used to provide an evaluation of the executed wash. In a simple embodiment, for example, two fields can be output: one field for positive evaluations (for example with a stylized representation of a thumb pointing upwards) and one field for negative evaluations (for example with a stylized representation of a thumb pointing downwards). Of course, other field contents can also be selected (for example, a plus sign or a minus sign). The field contents can be selected in a configuration phase. The fields are interactive and can be operated, for example, by gesture control or gesture interaction. In step S3, the signals on the output fields are acquired as evaluation signals. In a simple embodiment, only one evaluation signal is acquired in binary form (plus/wash satisfactory/no objections or minus/wash deficient/with objections). In other embodiments, the evaluation signal may be recorded as a categorical variable and may include, for example, the categories "very good", "good", "medium", "sufficient", "poor". Alternatively, the evaluation signal may be recorded as a numerical variable in terms of a grading scale. In a preferred embodiment, it can be configured which of the categories are to be mapped to a positive rating and which of the categories are to be mapped to a negative rating. The application is configured to distinguish which type of evaluation signal is captured and, in particular, whether it is a positive evaluation signal or a negative evaluation signal. If it is a negative evaluation signal, a generated interactive virtualized representation V of the respective vehicle is read in in step S4 and output or displayed on the human-machine interface HMI.

In a first embodiment, the interactive virtualized representation V is generated locally and directly on the mobile terminal device H. The virtualized representation V is generated by the mobile terminal device. This can be executed, for example, by means of the application installed there. In a second embodiment, the interactive virtualized representation V is not generated locally on the mobile terminal H, but on an external, separate instance, for example on a server SV. The server SV then transmits (after computing the virtualized representation of the vehicle or vehicle type) the representation data for rendering the interactive virtualized representation V to the mobile terminal H to enable it to output the interactive virtualized representation V on the human-machine interface HMI.

The interactive virtualized representation V of the vehicle is calculated or generated as a function of the vehicle type/vehicle model (for example, Tesla Model Y or BMWi4) or even as a function of the particular vehicle (i.e., vehicle-specific). To enable this, in a further preferred embodiment, a feature model can be accessed (this is explained in more detail below in connection with FIG. 5).

The application is further adapted to issue a prompt or request AF on the human-machine interface HMI in step S5. The request AF may be issued in visual and/or audible form to indicate to the user that he should activate those areas that he wishes to object to. In other words, he is to mark in the interactive virtualized representation V the vehicle areas on which an insufficient washing result is to be noted. Thereupon, in step S6, the areas activated in response to the request AF are detected in the output interactive virtualized representation of the vehicle V as activation signals as. The activation signals as are initially related to the coordinate system of the interactive virtualized representation V. Therefore, the activation signals as cannot be used directly to control and/or regulate the working units at the car wash WA and thus in the coordinate system of the car wash WA. Therefore, a conversion algorithm is provided which calculates—preferably by coordinate transformation—position information in response to the acquired activation signals as with respect to the vehicle coordinate system or to the coordinate system of the washing system WA. The calculated position information represents the identified objected areas on the vehicle.

This step S7 for identifying the objected areas (in the coordinate system of the vehicle and/or the car wash WA) can, in a first embodiment, be executed locally and directly on the mobile terminal H, or it can be executed indirectly on a separate device, for example on a server SV. In the latter case, only the identification data representing the offending areas on the vehicle are read in on the mobile terminal H by the server SV and subsequently processed.

In step S8, feedback signals rs are generated. The feedback signals rs are forwarded to the control module SM via the control interface STS in step S9. The feedback signals rs encode the identified objected vehicle areas. After receiving the feedback signals rs on the control module SM, the latter can initiate appropriate improvement actions. The feedback signals rs may, for example, indicate at least one work unit A that was involved in cleaning the objected area. In this respect, a conclusion can be drawn about the respective working unit A, for example, in order to subject it to an inspection measure. If, for example, the feedback signals rs indicate that the offending areas relate to the rims, an automatic inspection procedure of selected working units, in this case the rim washers, can be initiated.

In a preferred embodiment of the invention, further process steps can optionally be carried out (dashed lines) after the activation signals as have been detected in step S6. In particular, it is possible to generate an adaptive dialog menu in a step S6a. This can be executed in response to the detected evaluation signal and/or in response to the detected activation signal as in the interactive virtualized display V. The adaptive dialog menu is provided or output in a step S6b (dashed line) on the human-machine interface HMI and is used to specify the evaluations or ratings. For example, in the case of a negative rating, the adaptive dialog menu may additionally query a degree of dissatisfaction (info configurable levels or categories). Cumulatively or alternatively, it is possible to query whether there are particularly high-quality degradations in certain sub-areas within the objected area, while in other sub-areas there are lower quality degradations or none at all. Cumulatively or alternatively, it can be queried whether the objected areas of the vehicle have already been the subject of frequent negative evaluations (if so, it can be concluded that this is a critical area and thus possibly a critical feature. If no feature exists for the area yet, the creation of a feature in the feature model can be initiated).

Figure 3:
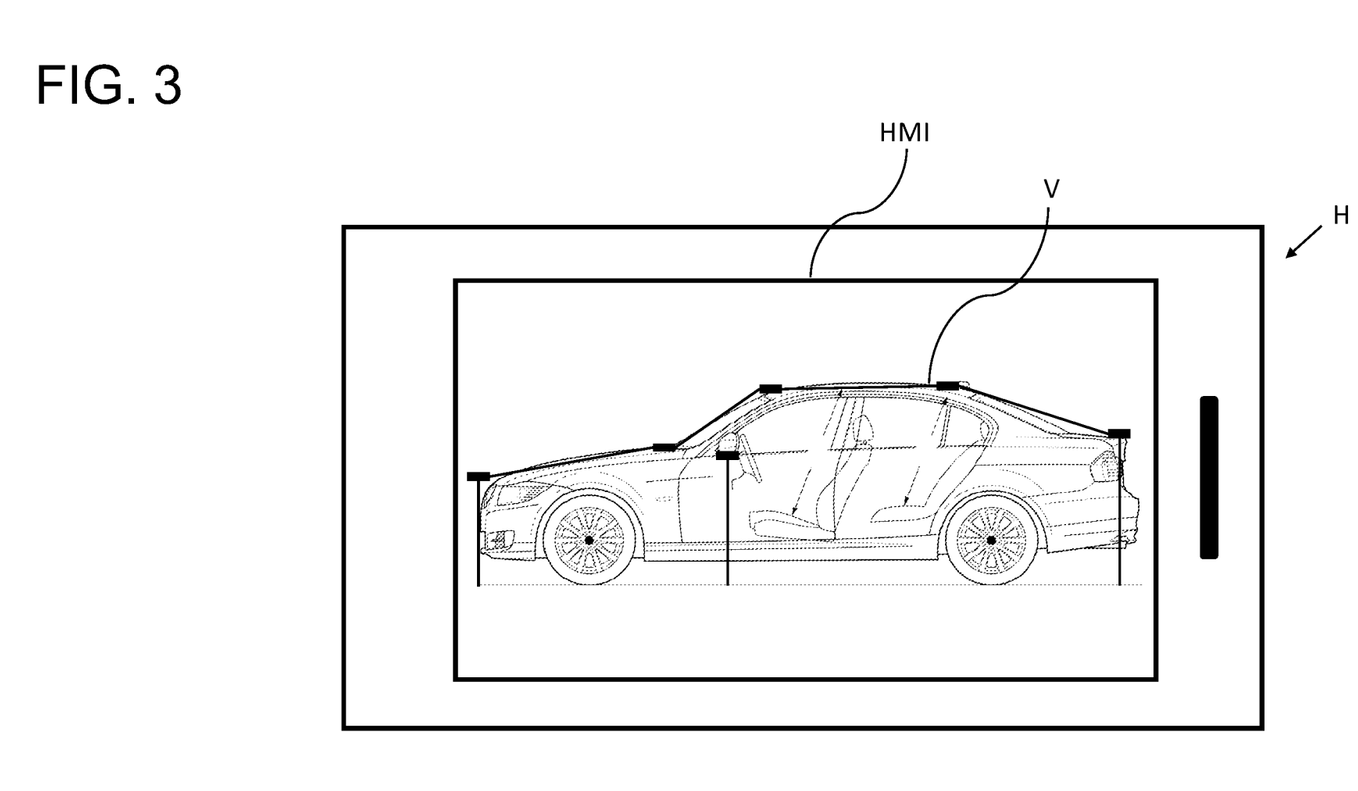
FIG. 3 shows in a schematic representation of a generated interactive virtualized representation of the vehicle on an example.

FIG. 3 shows a schematic representation of a mobile terminal H with a human-machine interface HMI on which a vehicle-specific interactive virtualized display V is provided. As the name implies, the representation is interactive, so that sections, excerpts or specific vehicle areas can be selected for subsequent evaluation. In a configuration phase, it is possible to specify whether only areas to be objected (i.e. objectionable areas) are to be detected or whether it should also be possible to evaluate areas positively.

Figure 4:
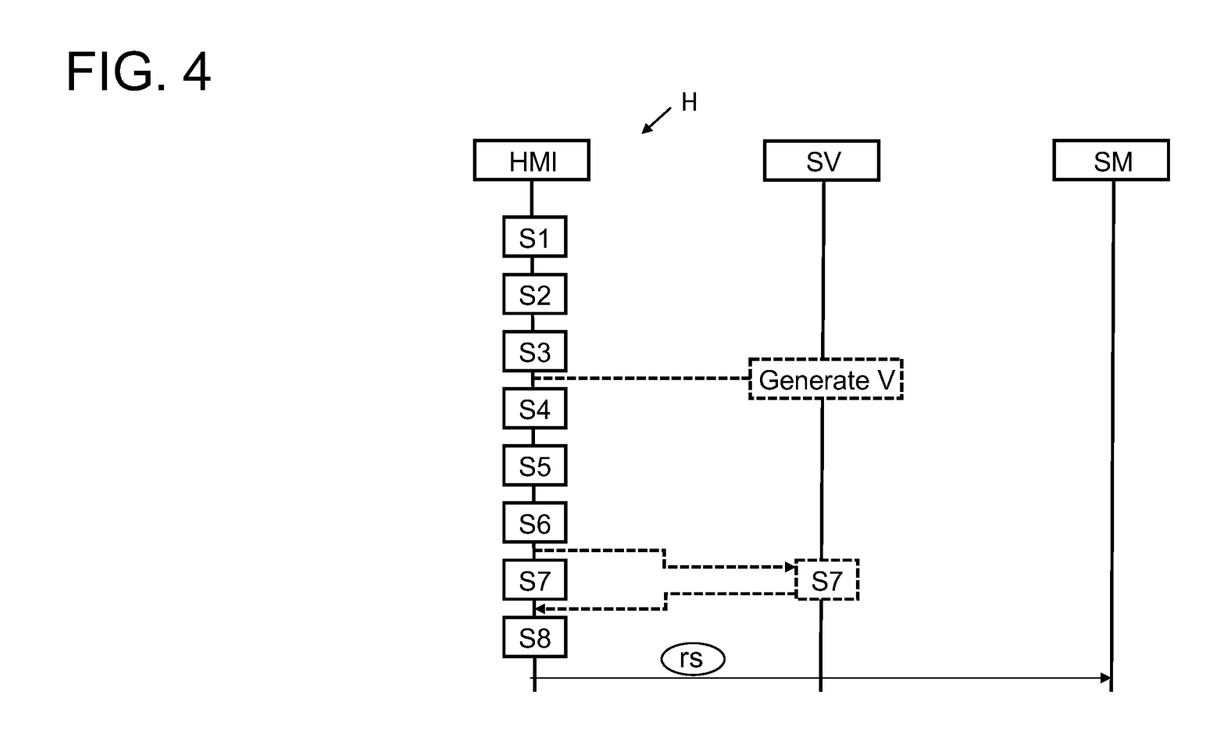
FIG. 4 is an interaction diagram between the mobile terminal and a control module and optionally a server.

FIG. 4 shows in an interaction diagram the data exchange between the mobile terminal H and the control module SM and optionally a server SV according to an advantageous embodiment of the invention. As shown in FIG. 4, in a first embodiment, all of the aforementioned method steps S1 to S9 can be executed locally on the mobile terminal H. To execute these steps, preferably the application is installed and executed on the mobile terminal H. After the feedback signals rs have been generated on the mobile terminal H in step S8, they can be transmitted to the control module SM in step S9 for further processing. In particular, verification measures and corrective measures can be initiated there (i.e., on the part of the washing system WA) with respect to the involved working units A. "Involved working units" in this context means a selection of those working units A which were involved in the washing of the objected areas. The selection of these involved working units A can be calculated from the feedback signals rs by means of the identification algorithm.

As shown in FIG. 4 by the dashed arrows and boxes, the generation of the interactive virtualized representation of the vehicle V may alternatively or at least partially be performed on the server SV. Thereafter, the representation data (dashed line from the server V to the mobile terminal H before the step S4) may be transmitted back to the mobile terminal H to render the interactive virtualized representation V of the respective vehicle or type of vehicle. Furthermore, step S7 for identifying the objected vehicle areas in the coordinate system of the vehicle or the car wash WA could also be executed on the server SV. This is also shown in dashed lines in FIG. 4. This means that the computationally intensive process steps can also be outsourced to a device with greater resources (processor power, memory capacity, etc.) and do not have to be handled locally via the application on the mobile terminal H.

Figure 5:
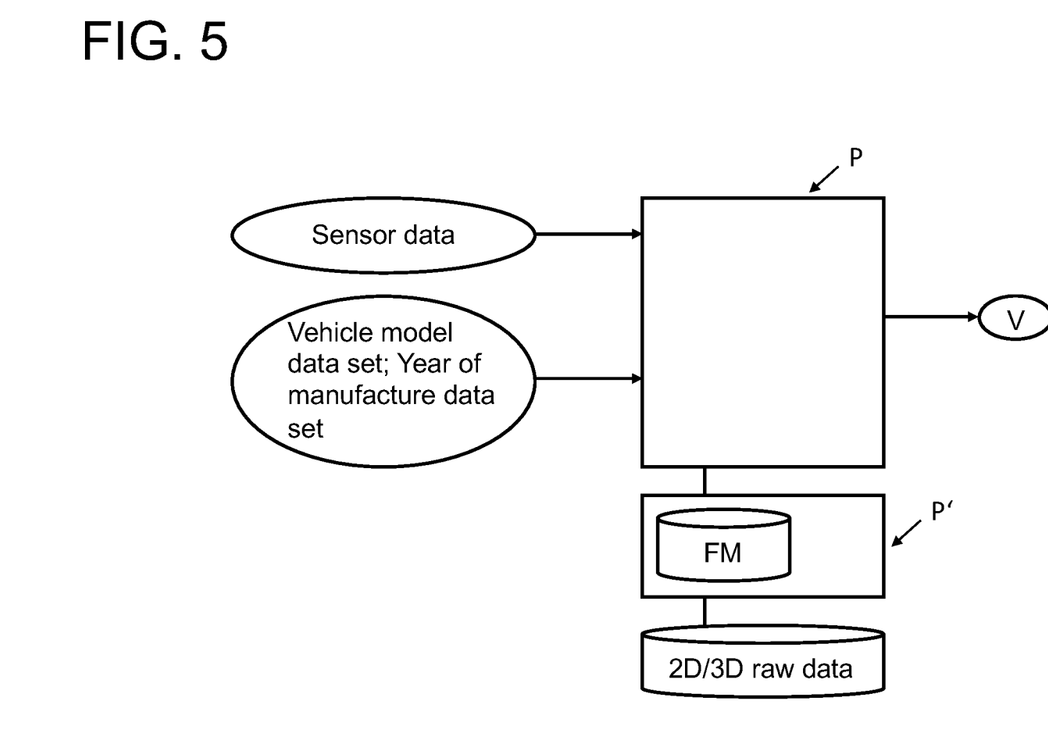
FIG. 5 shows schematically a block diagram of electronic components, in particular microprocessor components and digital structures for generating the interactive virtualized representation of the vehicle.

FIG. 5 is a schematic block diagram representation of a computing unit or processor P designed to generate the interactive virtualized representation of the vehicle V. The processor P can be implemented locally on the control module SM or be in data exchange with them and implemented, for example, on the server SV or on the central processing unit ZV. The processor P has an input interface to receive sensor data from sensors (for example optical data from a camera or from photoelectric sensors or from LIDAR sensors) that detect characteristics of the vehicle and are preferably formed on the car wash WA. The input interface is further adapted to receive a vehicle model data set and/or a year of manufacture data set (for example, these data sets may be retrieved by the application implemented on the mobile terminal H and fed to the processor P via the input interfaces). The processor P is further adapted to access another processor P' in which a generated feature model FM is stored. The feature model FM associates a set of features with the tuple of vehicle model data set and year of manufacture data set. The feature model is generated specifically for each vehicle, in particular from two-dimensional or three-dimensional raw contour data. The processor P accesses the feature model FM with the received sensor data and/or with the received vehicle model data set and year of manufacture data set to render a virtualized representation V of the respective vehicle model. The generated virtualized representation V is interactive in that areas in the representation can be selectively activated. This can be done, for example, by mouse clicks or by suitable input signals.

Figure 6:
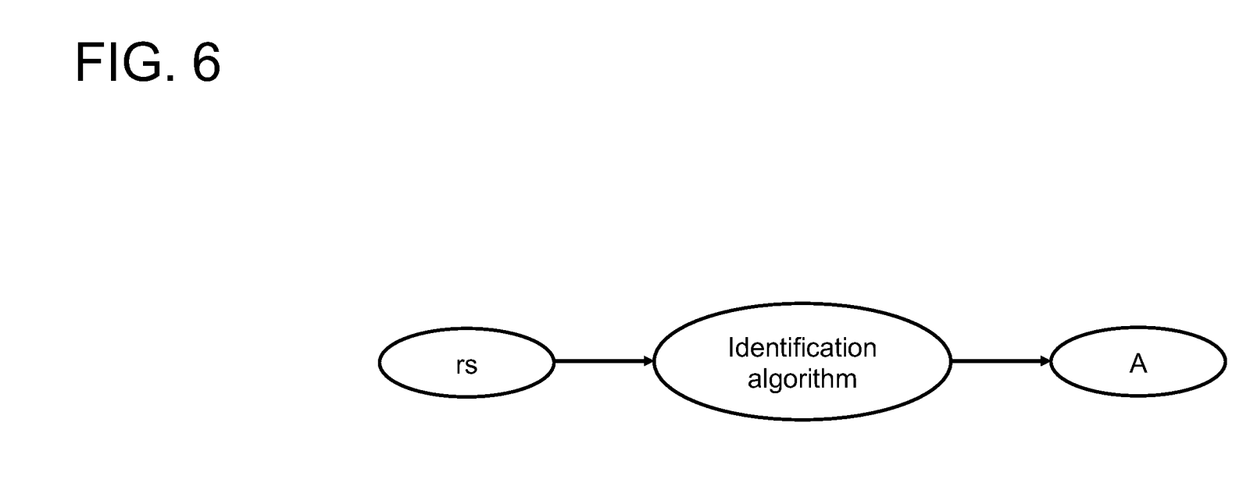
FIG. 6 shows an identification algorithm for identifying affected working units.

FIG. 6 describes the identification algorithm which can be implemented, for example, on the control module SM or on the server SV or on the central processing unit ZV and which is used to determine from the received feedback signals rs those working units A which were involved in the executed washing of or in the objected area or areas. In the feedback signals rs, at least one objected area is addressed that has been activated locally on the application on the mobile terminal H in the interactive virtualized display V as being deficient and objectionable.

Finally, it should be noted that the description of the invention and the embodiments are in principle not to be understood restrictively with respect to any particular physical realization of the invention. All features explained and shown in connection with individual embodiments of the invention may be provided in different combinations in the subject matter according to the invention in order to simultaneously realize their advantageous effects.

The sequence of process steps can be varied as far as technically possible.

The scope of protection of the present invention is given by the claims and is not limited by the features explained in the description or shown in the figures.

In particular, it is obvious to a person skilled in the art that the invention can be applied not only to the mentioned architectural examples (e.g. as a local system or as a distributed system), but also to other system architectures. For example, the components of the system, such as the control module SM, can be implemented on one unit/device or distributed on several physical-technical products. Furthermore, the invention can be applied not only to gantry car wash systems, but also to other types of car wash systems (car wash line or commercial vehicle wash systems).

The invention claimed is:

1. A computer-implemented method for evaluating a vehicle wash performed on a car wash, comprising the following method steps, which are at least partially performed on a mobile terminal:
    providing a human-machine interface and a control interface to a control module of a washing system;
    outputting fields on the human-machine interface used to detect at least one evaluation signal to evaluate the wash;
    upon detection of a negative evaluation signal: reading in a generated interactive virtualized representation of the vehicle and outputting the same on the human-machine interface of the mobile terminal;
    issuing a request on human-machine interface to activate the areas to be objected in the interactive virtualized representation by means of activation signals;
    acquisition of the activation signals in the interactive virtualized representation;
    reading in an identification of the objected areas on the vehicle based on the detected activation signals;
    generating feedback signals for forwarding to the control module via the control interface, the feedback signals encoding the identified objected areas.

2. The method of claim 1, wherein the generated interactive virtualized representation of the vehicle is vehicle type specific or vehicle specific.

3. The method according to claim 1, wherein the generation of the interactive virtualized representation of the vehicle is performed in response to sensor data.

4. The method according to claim 1, wherein the feedback signals comprise status signals specifying the executed wash.

5. The method according to claim 1, wherein the feedback signals comprise signals selected from the group consisting of: meta-information about the executed wash, about the vehicle, about the washing system with which the wash has been executed and/or about the evaluation signal.

6. The method according to claim 1, wherein an adaptive dialog menu is provided on the human-machine interface for specifying the evaluations, which is adaptively generated based on the detected evaluation signals.

7. A system for modifying process data of a washing system based on detected evaluations of vehicle washes performed on the washing system with:
    a set of mobile terminals each adapted to perform a method according to claim 1;

a control module, which is implemented on the washing system and serves to control and/or regulate the washing system on the basis of the acquired feedback signals encoding evaluations of vehicle washes performed on the washing system, and which is in data exchange with the mobile terminals via the control interface.

8. The system according to claim 7, in which the system further comprises a central processing unit which is in data exchange with the respective control modules of the washing system of a plurality of washing systems and which is configured to determine control variables for the plurality of washing systems on the basis of the feedback signals for the plurality of washing systems.

9. The system according to claim 7, in which the central processing unit is configured to evaluate the feedback signals from a plurality of terminals with respect to different washing systems.

10. The system according to claim 9, wherein the feedback signals to an individually objected wash on the control module are compared with local or central reference values to generate and output a deviation message in case of deviations.

11. The system according to claim 10, wherein the feedback signals to an individually objected wash on the control module are compared with local or central reference values to generate and output a deviation message in case of deviations.

12. The system according to claim 9, in which the central processing unit is configured to evaluate the feedback signals from a plurality of terminals with respect to different washing systems and to evaluate them for program sections of a wash, which benchmark values are transmitted by the central processing unit to the respective washing system.

13. The system according to claim 9, in which the central processing unit is configured to evaluate the feedback signals from a plurality of terminals with respect to different washing systems and to evaluate them for program sections of a wash, which benchmark values are transmitted by the central processing unit to instances assigned thereto.

14. The system according to claim 9, wherein the feedback signals to an individually objected wash on the central processing unit are compared with local or central reference values to generate and output a deviation message in case of deviations.

15. The system according to claim 14, wherein the feedback signals to an individually objected wash on the central processing unit are compared with local or central reference values to generate and output a deviation message in case of deviations.

16. The system according to claim 7, in which the feedback signals from a plurality of terminals are evaluated in relation to a washing system in each case in order, in the event of statistically significant accumulation of one type of feedback signals, to initiate automatically checking measures on the washing system and, in particular, for the working units addressed in the feedback signals.

17. The system according to claim 7, in which the control module is set up to store process data of activated working units in a memory in the context of washes carried out on the washing system, and in which the control module is further set up to correlating the feedback signals received from the mobile terminal via the control interface with the stored process data, in particular correlating them on the basis of position, in order to initiate checking measures only for selected working units, namely for those working units which were activated during the wash in the areas in question.

18. The system according to claim 7, in which the central processing unit is configured to evaluate the feedback signals from a plurality of terminals with respect to different washing systems and to evaluate them for comparative evaluation of all washing systems, so that benchmark values are determined for one washing system in each case.

19. The system according to claim 18, wherein the verification measures comprise a comparison with a preconfigurable reference value or reference value range with respect to a feature selected from the group consisting of the type of feedback signal and/or a local verification of a working unit of the washing system as part of a predictive maintenance procedure.

20. A control module for a system, comprising:
a control interface to a set of mobile terminals each adapted to perform a method according to claim 1;
wherein the control module is implemented on the washing system and serves to receive generated feedback signals, wherein the feedback signals encode the identified objected areas, and wherein the control module serves to control and/or regulate the working units of the washing system on the basis of the detected feedback signals relating to vehicle washes previously carried out on the washing system.

21. A memory unit of a computing unit, the memory unit having stored thereon a computer program, the computer program containing program code portions for causing the computing unit to execute the method for controlling and/or regulating a car wash according to claim 1 when the computer program is executed in the computing unit.

22. The method according to claim 1, wherein the generation of the interactive virtualized representation of the vehicle is performed with access to a stored feature model encoding the contour of the vehicle or vehicle type in question.

23. The method according to claim 1, wherein the generation of the interactive virtualized representation of the vehicle is performed with access to a stored feature model encoding the contour of the vehicle or vehicle type in question and in response to a captured vehicle model data set and a captured year of manufacture data set.

* * * * *